Aug. 16, 1927.

J. M. HARGRAVE

CLAMP

Filed April 23, 1925

1,638,848

INVENTOR:

John M. Hargrave

Patented Aug. 16, 1927.

1,638,848

UNITED STATES PATENT OFFICE.

JOHN M. HARGRAVE, OF CINCINNATI, OHIO.

CLAMP.

Application filed April 23, 1925. Serial No. 25,444.

My invention relates to clamps, such as are used in cabinet work, and for various purposes, and in which a slider with a holding pawl of some character is employed in connection with a member operated by a screw or other power means.

In the provision of a clamp of the type noted the usual practice is to provide a bar, along which the two members that engage a piece of work are to move. The pawl controlled slider is provided with a pawl which engages in teeth cut in the bar, usually in the edge of the bar.

The bars in clamps of this character are used so that the edgewise dimensions thereof are opposed to the load, and the teeth cut for the pawl have thus been formed in the edges of the bar.

In devices of the character now noted, the teeth cannot be placed too closely together or else there will be so much weakness of metal between the teeth that the clamp will fail. Also the teeth cut into the bar will wear, and permit the pawl to slip, with the result of releasing the work, and too deep a tooth will result in a weakness thereof.

It is the object of my invention to provide a bar in which the teeth are formed in the side face thereof, and in which the teeth, instead of being cut out, as by a series of curfing operations, will be formed up by dies. Thus in the bar there is no weakness developed in the metal between the teeth, permitting a closer spacing. The form of the teeth can be arranged so that a tapering socket is provided for the pawl with a decidedly deep shoulder, thereby eliminating the chances of wear. Also, of course, the shop operations in forming the teeth are much less expensive, than is a cutting operation.

I accomplish my object, which as stated relates to the bar portion of a clamp, of the type described, by that certain construction and arrangement of parts to be hereinafter more specifically pointed out and claimed.

Figure 1:
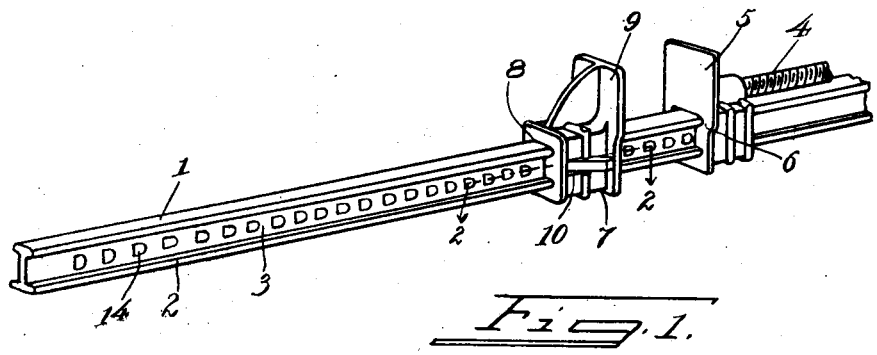
Figure 1 is a perspective view of a portion of a clamp, showing the bar, the slider and the screw adjusted clamp member.
Figure 2:
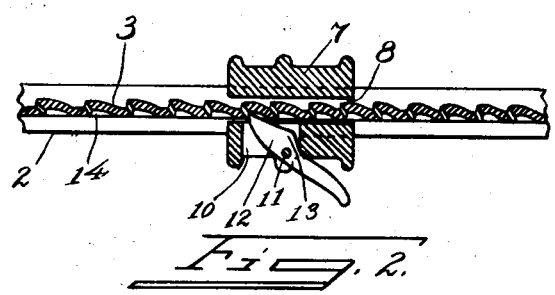
Figure 2 is a section on the line 2—2 of Figure 1.

The bar is shown as an I-beam type, although this is not a requisite. In the bar shown there are top and bottom flanges 1 and 2, and a main portion or web 3. The screw 4 controls the position of the clamp member 5, which is so formed as to snugly fit the bar and slide thereon. For this purpose it has an I-shaped recess 6 to fit over the bar.

The pawl controlled slider has a body 7, with an I-shaped recess 8, and a clamp face 9. In the side of the body is an aperture 10, in which the pawl finds its support. A pin 11 across this recess holds the pawl 12, in pivotal relation, and the pawl is formed with a shoulder 13, which rocks against the front face of the aperture, in order to take strain off the pivot pin.

The bar has its main portion or web formed in a series of depressions 14, having an abrupt wall or shoulder of considerable depth, and a sloping face, away from the shoulder. Preferably the outline of the depressions is roughly a sector with the wide portion at the shoulder part of the depressions.

The pawl engages in these depressions, with its point abutting the shoulder, and drags over the tapered portions during adjustment.

The operator can, in manipulating the pawl slider, grasp it so that the pawl is held out of meshing relation with the formed out depressions or the teeth, depending upon how they are regarded. This is an easier operation than one in which the pawl engaged the edge of the bar.

There is no breaking of the surface of the bar in forming the teeth and in fact the corrugations resulting from forming the depressions serve to strengthen the bar against strains. The depressions can be placed close together without sacrificing strength, and the shoulders can be made quite deep to forestall the effects of wear.

Naturally the operation of stamping the depressions into the bar is an easy one to perform in a press having a suitable die.

Having thus described my invention, what I claim as new and desire to secure by Letters Patent, is:

A metallic clamp comprising a straight I shaped bar having interspaced notches died out in the median lengthwise portion thereof, a clamping member having a pawl for engaging the notches, said member fitting the I shaped bar and being adjustable longitudinally of said bar, and a co-operating clamping member shaped so as to also engage the bar, said clamping member provided with means for the gradual adjustment thereof with relation to said first mentioned clamping member and both clamping members having thin clamping portions extending clear of the plane of the supporting bar.

JOHN M. HARGRAVE.